Patented Aug. 14, 1928.

1,680,540

UNITED STATES PATENT OFFICE.

ERIK HÄGGLUND, OF ABO, FINLAND.

METHOD OF TREATING AND UTILIZING THE BLACK LIQUOR OBTAINED IN THE MANUFACTURE OF SODA AND SULPHATE CELLULOSE.

No Drawing. Application filed June 18, 1927, Serial No. 199,873, and in Sweden June 21, 1926.

The invention is an improvement in or modification of that claimed in my prior application Serial No. 43,367, filed July 13th, 1925, according to which the black liquor obtained in the manufacture of soda or sulphate cellulose, is first subjected to a suitable heat and pressure treatment (at say 350° C. and 150–200 atm.) adapted to precipitate the chief quantity of the organic substances contained therein, in the form of carbonaceous and tarry matter, whereupon the solution discharged from the high pressure tank is treated for the purpose of extracting from it valuable organic compounds and of converting the alkali contained therein into caustic form.

According to one method of carrying out the said prior process the acetate contained within the lye discharged from the high pressure tank is separated off by crystallization. To this end the liquor is rendered alkaline with a caustic alkali, which step is hereinafter referred to as "causticization" and is thereupon concentrated to cause the acetate contained in it to crystallize out. The mother liquor forming fresh white liquor is returned to the boiler.

The causticization of the liquid coming from the high pressure tank does not, however, afford a sufficiently reliable means for preventing the simultaneous precipitation of other sodium salts, for example in the form of soda. It may be advisable, therefore, in certain conditions, to abandon the direct method of extracting the acetate by crystallizing it out after the causticization, and to resort to a method, which although less direct, yields acetate of a greater degree of purity. According to the present invention this is done by first evaporating to dryness the solution which is discharged from the high pressure tank, thereby producing a residue containing acetate and soda, and thereupon recovering the acetate by separating it from the less soluble soda by fractional lixiviation of the residue.

In order to increase further the degree of purity of the acetate, it is advisable to heat the dry residue (of the solution withdrawn from the high pressure tank) before it is fractionally lixiviated, to such a degree that whereas the acetate remains undecomposed, the remainder of other organic compounds present in the solution is decomposed, being partly carbonized and partly broken down into volatile compounds. Substances produced by such heating are for example: formates, propionates and butyrates. It has been found suitable to heat to a temperature of about 300° C.

The fractional lixiviation gives a very pure acetate solution, which is separated from the solid residue which contains besides soda amongst other substances the carbonized products of decomposition of organic compounds. The dry residue is subjected to causticization for the purpose of recovering white liquor for opening up fresh quantities of wood, straw or the like; the carbonized products pass into the causticization slime.

What I claim is:—

1. The method of treating and utilizing the black liquor obtained in the manufacture of soda and sulphate cellulose which consists in subjecting said liquor to a heat and pressure treatment adapted to precipitate the main portion of organic substances therein as carbonaceous and pitchy material, then separating the liquor from the precipitate, evaporating said liquor to dryness, subjecting the dry residue to fractional lixiviation so as to obtain therefrom an acetate solution, separating said acetate solution from the dry residue, causticizing the residue and using the causticized residue as causticizing agent in white lye.

2. A process as claimed in claim 1, wherein the dry residue is subjected to a heating process before it is lixiviated, said heating process adapted to decompose the remainder of organic substances present in the said residue besides the acetate.

In testimony whereof, I have signed my name to this specification at Berlin this 7th day of June, 1927.

ERIK HÄGGLUND.